Patented Feb. 18, 1947

2,415,848

UNITED STATES PATENT OFFICE 2,415,848

BLACK POWDER

William H. Rinkenbach and Vernon C. Allison, Dover, N. J., assignors to Government of the United States, as represented by the Secretary of War No Drawing. Application January 11, 1937, Serial No. 120,120

7 Claims. (Cl. 52—17)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to black powder.

In the manufacture of fuzes for projectiles and fuzes used in blasting operations it is desirable to use black powder having fixed slow rates of burning appropriate to the particular purpose of the design. Black powder made according to the usual procedure and containing 15% of charcoal made from wood usually has a higher burning rate than is desirable, and various methods have been used to overcome this. Among these may be mentioned increasing the proportion of sulphur in the composition, the addition of an oil, the use of coal instead of charcoal, and the addition of a more or less inert solid such as rosin or talc. Each of these methods is, however, open to serious objection from the viewpoint of either manufacture or functioning.

We have discovered that if the charcoal used in black powder is replaced wholly or in part with the non-cellular carbon of high purity prepared by the decomposition of sugar, the black powder burns much more slowly than that containing wood charcoal only. Illustrative of this are the following burning tests of black powders loaded in a standard fuze and fired at full setting:

| Composition of black powder | | | | Burning time, secs. |
|---|---|---|---|---|
| Potassium nitrate, per cent | Sulphur, per cent | Wood charcoal, per cent | Sugar carbon, per cent | |
| 74.0 | 10.4 | 15.6 | | 29.2 |
| 74.0 | 10.4 | 9.36 | 6.24 | 35.3 |
| 74.0 | 10.4 | 5.2 | 10.4 | 47.6 |
| 74.0 | 10.4 | 3.12 | 12.48 | 66.0 |
| 74.0 | 10.4 | | 15.6 | 96.4 |

From these data it is evident that the burning rate of black powder can be varied over an extremely wide range, without affecting its ultimate composition, by substituting carbon prepared from sugar for part or all of the wood charcoal used ordinarily. Since sugar carbon is non-cellular, its use decreases the necessity for the complete and lengthy incorporation usually required when wood charcoal alone is used. Another advantage of the use of sugar carbon is the fact that commercial sugar is a pure chemical compound and the carbon of high purity can be prepared from it with ease; whereas charcoal is difficult to control with respect to composition and so tends to give black powders of variable burning characteristics.

We claim:

1. A slow-burning black powder composition for a time train comprising potassium nitrate 74%, sulphur 10.4%, and wood charcoal and sugar carbon 15.6%.

2. A slow-burning black powder composition for a time train comprising potassium nitrate 74%, sulphur 10.4%, and sugar carbon 15.6%.

3. A slow-burning black powder composition for a time train comprising potassium nitrate, sulphur, wood charcoal and carbon prepared from sugar.

4. A slow-burning black powder composition for a time train comprising potassium nitrate, sulphur and carbon prepared from sugar.

5. Black powder having its carbon content at least partly consisting of carbon prepared from sugar.

6. A black powder comprising an alkali metal nitrate, sulphur and carbon prepared from sugar.

7. A time train consisting of a black powder composition comprising an alkali metal nitrate, sulphur, wood charcoal and carbon prepared from sugar.

WILLIAM H. RINKENBACH.
VERNON C. ALLISON.

REFERENCES CITED

The following references are of record in the file of this patent:

UNITED STATES PATENTS

| Number | Name | Date |
|---|---|---|
| 167,503 | Courteille | Sept. 7, 1875 |

FOREIGN PATENTS

| Number | Country | Date |
|---|---|---|
| 2,057 | British | of 1865 |
| 297,365 | British | Sept. 17, 1928 |

OTHER REFERENCES

Mellor, "Comprehensive Treatise on Inorganic and Theoretical Chemistry," volume 5, page 747, published by Longmans, Green and Co., New York, 1924. (Copy in Division 59.)

Guttmann, "Manufacture of Explosives," volume 1, pages 271 and 272, MacMillan and Co., New York, 1895. (Copy in Division 43.)